Dec. 10, 1968 A. M. GORDON 3,416,025

ELECTROMAGNETIC DEFLECTION SYSTEM

Filed April 14, 1965 2 Sheets-Sheet 1

INVENTOR
A. M. GORDON
BY
ATTORNEY

Dec. 10, 1968 A. M. GORDON 3,416,025

ELECTROMAGNETIC DEFLECTION SYSTEM

Filed April 14, 1965 2 Sheets-Sheet 2

United States Patent Office 3,416,025
Patented Dec. 10, 1968

3,416,025

ELECTROMAGNETIC DEFLECTION SYSTEM

Alan M. Gordon, Matawan Township, Monmouth, N.J., assignor to Bell Telephone Laboratories, Incorporated, New York, N.Y., a corporation of New York Filed Apr. 14, 1965, Ser. No. 448,146
4 Claims. (Cl. 315—27)

ABSTRACT OF THE DISCLOSURE

A linear sawtooth deflection current waveform with extremely short flyback time is assured by enhancing the rate of change of current supplied to the deflection windings associated with a cathode ray device. Selective modification of the deflection current waveform at prescribed times is accomplished by shunting the deflection windings of a CRT with an auxiliary inductor and by energizing the system with trapezoidal waveform pulses. This arrangement serves to prevent the circuit supplying the deflection currents from immediately cutting off at the termination of each driving pulse. Extension of the ON time results in the application of a brief negative pulse to the deflection windings during a retrace interval which increases the rate of change of current in the windings and speeds up beam retrace.

Figure 1:
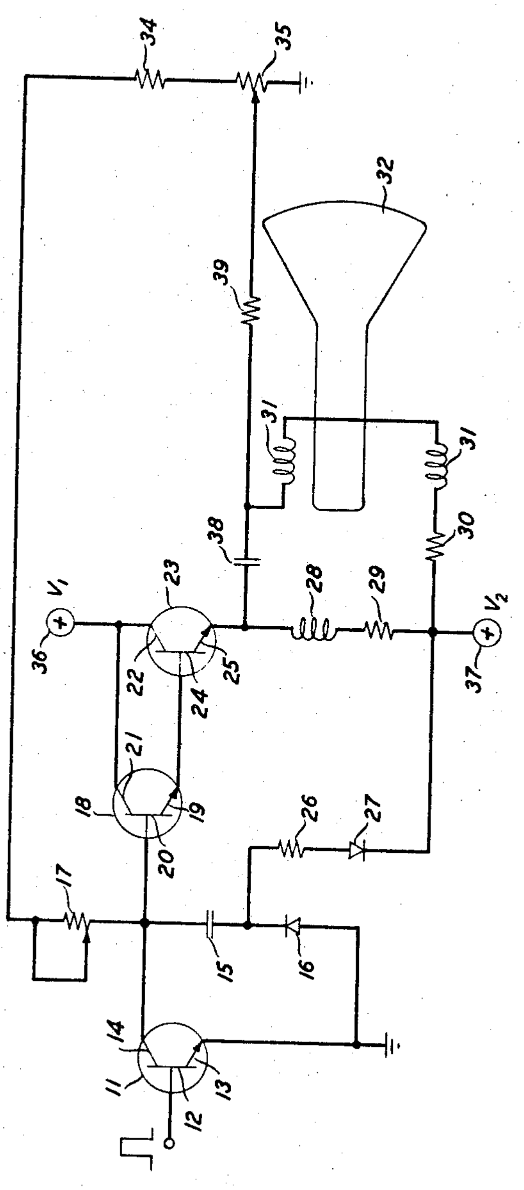

This invention pertains to electromagnetic deflection systems and, more particularly, to circuits for generating currents effective to deflect an electron beam across a target, such as the face of a vidicon or cathode ray display tube, at one rate and for returning it at another rate.

An image may be developed on a display medium, for example, the face of a cathode ray tube, by scanning the face with a "writing" electron beam in a series of vertically spaced horizontal lines. The electron beam is deflected both vertically and horizontally from its normal undeflected position in carrying out the scanning operation. Beam deflection may conveniently be produced by means of an electromagnetic deflection yoke wherein currents of a linear sawtooth waveform are circulated to develop the desired time-varying magnetic field. It is generally desirable that the deflection current vary in a fashion that assures a linear scan of the beam across the face of the tube. It is also generally desirable that the beam be returned quickly to its undeflected position after each horizontal sweep across the face of the tube. Beam return is referred to, by those skilled in the art, as retrace or flyback; normally a fast flyback is desired. Fast retrace assures, for example, that a succeeding synchronizing sync pulse will be effective to initiate the next line scan at the proper instant.

It is the principal object of this invention to generate sawtooth waveform current for an electromagnetic deflection system.

Another object is the generation of sawtooth current waveforms having extremely short flyback or retrace times.

These and other objects are accomplished, in accordance with the present invention, by enhancing the rate of change of current supplied to the deflection windings associated with the cathode ray device through a selective modification of the deflection current waveforms at prescribed times. Trapezoidal waveform pulses, for example, are generated in response to applied timing or sync signals and are applied to a transistor driver stage. The deflection yoke of a cathode ray tube connected in the emitter circuit of the driver stage is energized by these trapezoidal waveform pulses. In accordance with the practice of the invention. an auxiliary inductor is connected in shunt with the deflection windings. It is, therefore, also energized by the trapezoidal pulses and serves to extend the conduction of the driver stage beyond the time of cessation of the trapezoidal waveform pulses. Extension of the conduction time in this manner results, in effect, in the application of a negative-going narrow pulse to the deflection windings during the retrace interval. Since the rate of change of current in an inductor is proportional to the magnitude of the step voltage applied thereto, the application of these narrow pulses results in an increased rate of change of current and thus a faster retrace time.

These and further features and objects of the invention, its nature and various advantages, will be apparent upon a consideration of the attached drawings and of the following detailed description of the drawings.

Figure 2:
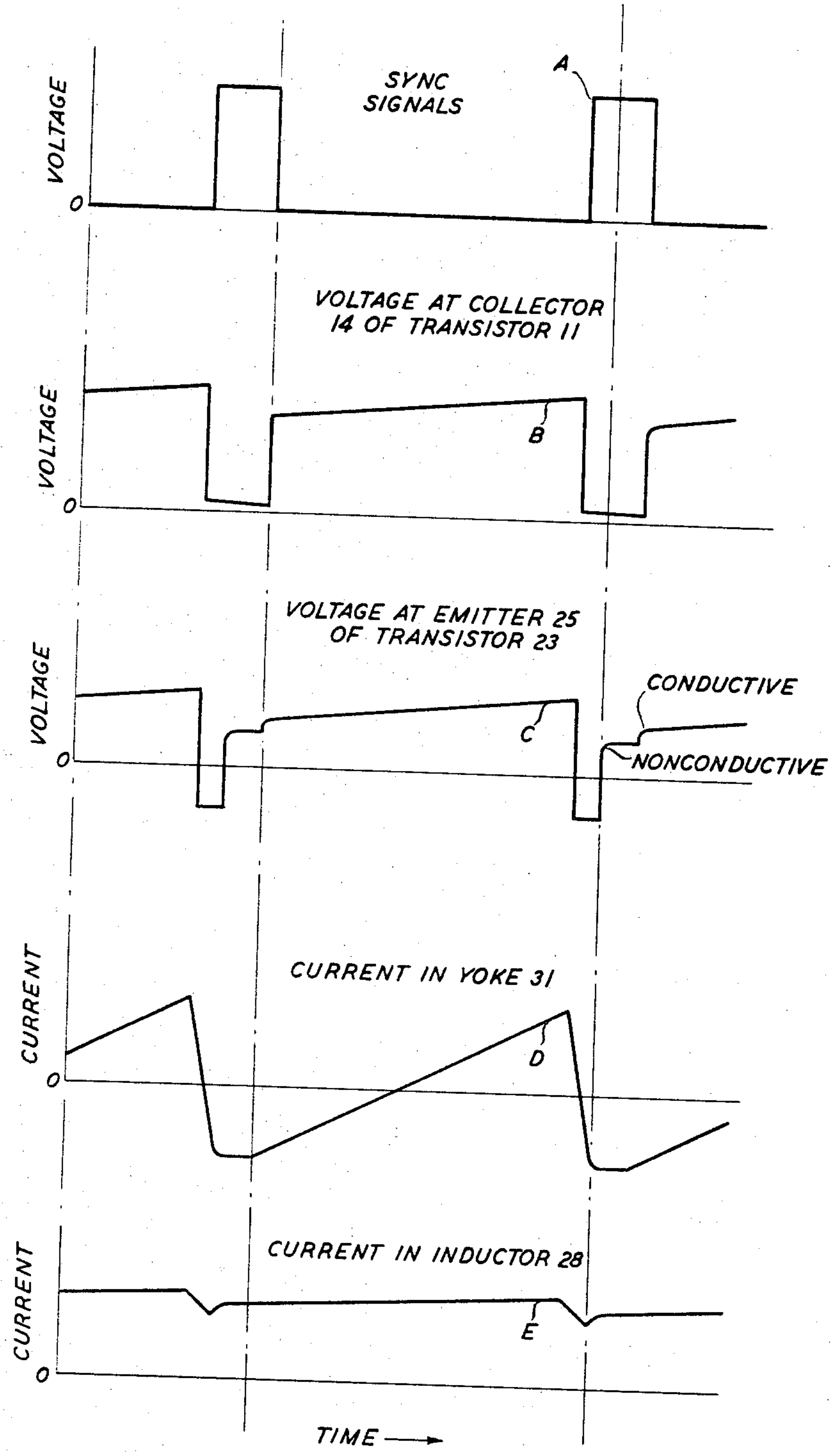

In the drawings:

FIG. 1 is a schematic circuit diagram illustrating a preferred embodiment of the invention; and FIG. 2 is a composite set of waveforms of various signals occurring during typical operation of the circuit depicted in FIG. 1.

In the circuit of FIG. 1, timing or synchronization pulses, depicted as waveform A of FIG. 2, are applied to base 12 of transistor 11. Upon the termination of a timing pulse, transistor 11 turns off resulting in a step increase in voltage at collector 14. The magnitude of this step is equal to the summation of the voltage $V_2$ of source 37, and the voltage drop across resistor 26 and unidirectional current device 27, e.g., a diode. The initial voltage across capacitor 15 which, due to the prior conduction of transistor 11, is approximately equal to ground potential, also enters into the determination of the step magnitude.

The voltage appearing at collector 14 of transistor 11, after such a step increase, rises exponentially toward the potential of source 36, designated as $V_1$, due to the charging of capacitor 15 through resistors 17, 26 and diode 27. Before this collector voltage has risen significantly, however, the occurrence of another timing pulse causes transistor 11 to saturate, reducing the collector voltage essentially to ground potential. Capacitor 15 discharges rapidly through the path provided by saturated transistor 11 and diode 16. Thus, as shown in waveform B of FIG. 2, a trapezoidal waveform is developed in response to the application of timing or synchronization pulses. The top of the trapezoidal waveform pulse is essentially linear because of the small portion of the exponential traversed in the time between synchronization pulses.

The trapezoidal voltage waveform thus developed is applied via transistors 18 and 23 to an inductor 31 which may, in a typical example, be the deflection yoke of cathode ray tube 32. Transistors 18 and 23 are connected in a Darlington configuration to provide a high input impedance, thus to minimize the loading effect on the trapezoidal waveform generator. In this configuration, transistors 18 and 23 act as a single transistor with a high input impedance. In the discussion that follows, reference to transistor 23 also refers to this transistor configuration.

The initial step increase of the trapezoidal waveform pulse turns on transistor 23 applying this voltage waveform to the deflection yoke 31 via capacitor 38. The resultant voltage applied to yoke 31 yields a linear increase in current through yoke 31 as depicted in waveform D of FIG. 2. Upon the termination of the linearly increasing portion of the trapezoidal waveform, the voltage at the input or base of transistor 23 steeply decreases to approximately ground potential. Generally, the application of such a steeply decreasing voltage to the base of a transistor renders the transistors nonconductive. The resultant voltage appearing at the emitter of transistor 23 would thereupon decrease to some positive voltage. The retrace or flyback time, which is proportional to the rate of change of current through yoke 31 and evidently to the magnitude of the step voltage decrease in the trapezoidal waveform, would therefore be substantially longer than that obtained by the practice of the present invention.

Accordingly, in the practice of the present invention, an auxiliary inductor 28, e.g., choke, is serially connected with a resistor 29 between the emitter 25 of transistor 23 and potential source 37. The use of auxiliary choke 28 effectively decreases the retrace time by a substantial margin. Thus, at the initiation of a timing pulse, the trapezoidal voltage generator output experiences a step decrease in voltage and, as a result, transistor 23 attempts to turn off. However, auxiliary choke 28 and deflection yoke 31 resist any abrupt change in current flow. Indeed, the magnitude of the inductance of choke 28 is so chosen that the current therethrough remains relatively constant, as shown in waveform E of FIG. 2. Inductor 28 in the emitter circuit of transistor 23 is consequently effective to cause the emitter voltage of transistor 23 to follow the drop of the applied signal. Choke 28 forces transistor 23 to remain in a state of conduction. Thus, the steep voltage decrease of the trapezoidal waveform is transmitted to the emitter of transistor 23, resulting in the application of a steep negative-going pulse to yoke 31. Waveform C of FIG. 2 illustrates the voltage waveform appearing at the emitter of transistor 23. The yoke 31 current decreases rapidly and linearly through zero to the point at which it equals the curent demanded by inductor 28. At this time, current is no longer extracted from transistor 23, but is supplied from energy stored in capacitor 38. Thus, transistor 23 turns off and an essentially constant loop current flows through inductor 28 and yoke 31. At the time at which transistor 23 turns off, its emitter experiences a positive increase in voltage. The emitter potential is then approximately equal to the potential of source 37, namely $V_2$, plus the voltage drop across resistor 29. It retains this value until the transistor turns on at the termination of an applied timing pulse.

As illustrated in waveform D of FIG. 2, the retrace time has been substantially decreased to approximately 30 percent of the timing pulse interval. As shown in waveform E of FIG. 2, the magnitude of the current through inductor 28 is relatively constant and is dependent on the voltage appearing across inductor 28 and resistor 29. The magnitude of this applied voltage may be adjusted by controlling the driving signal level, e.g., by means of variable resistor 17. Since the yoke current equals the current through inductor 28 when transistor 23 is off, the peak beam deflection is determined by these same parameters. In addition, the net change in charge on capacitor 38 must equal zero for each cycle. Thus, with a yoke current of the waveform illustrated in FIG. 2, peak deflections of the beam to the right must be nearly equal to those to the left. A slight deviation from exact equality is introduced by the flat portion of the current waveform. To correct for this inequality and any mechanical misalignments in cathode ray tube 32, a centering network consisting of resistors 34, 35 and 39 is utilized to introduce a small current flow through yoke 31 without affecting the sawtooth waveform of the deflection current.

It is to be understood that the embodiments shown and described herein are merely illustrative and that further modifications of this invention may be implemented by those skilled in the art without departing from the scope and spirit of the invention. For example, the polarity of potential sources and types of active elements illustratively shown may be changed as desired.

What is claimed is:

1. An electron beam deflection system comprising, in combination;

means for developing trapezoidal waveform pulses which includes, a transistor having base, collector and emitter electrodes, a first source of fixed potential conected through resisttive means to said collector electrode, a capacitor, a first unidirectional current device serially connected with said capacitor between said collector and emitter electrodes of said transistor, a second source of fixed potential, a second unidirectional current device connected in series with said second source, and resistive means for connecting said second unidirectional current device to the junction of said capacitor and said first unidirectional current device;

amplifier means having an input and an output;

means for applying said trapezoidal pulses to the input of said amplifier means;

electromagnetic deflection means;

means for applying the signal appearing at the output of said amplifying means to said deflection means;

and inductive means connected in shunt with said deflection means for extending the conduction time of said amplifier means a predetermined period of time beyond the time of cessation of said applied trapezoidal pulses.

2. In combination, means for generating a train of trapezoidal waveform pulses, a transistor having base, collector and emitter electrodes, means for applying said trapezoidal pulses to the base of said transistor, a source of fixed potential, a deflection yoke for a cathode ray tube connected in series circuit with said source of fixed potential, capacitor means for applying the signal appearing at the emitter electrode of said transistor to said deflection yoke, and inductive means connected in shunt with said deflection yoke and said capacitor for sustaining the current flow between the base and emitter of said transistor for a predetermined time after the extinction of each of said trapezoidal waveform pulses.

3. In a sweep control system for an electron beam device, means for generating a train of trapezoidal waveform pulses, a transistor having base, collector and emitter electrodes, means for applying said trapezoidal pulses to the base of said transistor, a capacitor, a source of fixed potential, a deflection yoke for a cathode ray tube connected in series circuit with said capacitor between the emitter electrode of said transistor and said source of fixed potential, and auxiliary inductive means connected in shunt with said deflection yoke and said capacitor for sustaining the current flow between the base and emitter of said transistor for a predetermined time after the termination of each of said trapezoidal waveform pulses.

4. A sawtooth current waveform generator comprising, in combination, a first transistor having base, collector and emitter electrodes, a first capacitor, a first unidirectional current device serially connected with said capacitor between said collector and emitter electrodes of said first transistor, a source of fixed potential, a second unidirectional current device connected in series with said source, resistive means for connecting said second unidirectional current device to the junction terminal of said first capacitor and said first unidirectional current device, a second transistor having base, collector and emitter electrodes, said base connected to the collector electrode of said first transistor, a second capacitor, a deflection yoke for a cathode ray tube connected in series circuit with said second capacitor between the emitter electrode of said second transistor and said source of fixed potential, and inductive means connected in shunt with said deflection yoke and said second capacitor.

References Cited

UNITED STATES PATENTS

| | | | |
|---|---|---|---|
| 3,147,397 | 9/1964 | Michaelson | 315—27 |
| 3,185,889 | 5/1965 | Attwood | 315—27 |
| 3,205,401 | 9/1965 | Flyer et al. | 315—27 |

RODNEY D. BENNETT, *Primary Examiner.*

J. G. BAXTER, *Assistant Examiner.*